(12) United States Patent
L'Henoret et al.

(10) Patent No.: US 8,860,291 B2
(45) Date of Patent: Oct. 14, 2014

(54) SPARK IGNITION DEVICE WITH IN-BUILT COMBUSTION SENSOR

(75) Inventors: Benjamin L'Henoret, Paris (FR); Jan Haag, Nittenau (DE); John A. Burrows, Cheshire (GB); Robin Clarke, Cheshire (GB); Paul Tinwell, Fayence (FR)

(73) Assignee: Federal-Mogul Ignition Company, Southfield, MI (US)

( * ) Notice: Subject to any disclaimer, the term of this patent is extended or adjusted under 35 U.S.C. 154(b) by 924 days.

(21) Appl. No.: 12/740,438

(22) PCT Filed: Oct. 29, 2008

(86) PCT No.: PCT/FR2008/001520
§ 371 (c)(1),
(2), (4) Date: Oct. 25, 2010

(87) PCT Pub. No.: WO2009/092888
PCT Pub. Date: Jul. 30, 2009

(65) Prior Publication Data
US 2011/0037372 A1    Feb. 17, 2011

Related U.S. Application Data

(60) Provisional application No. 60/983,334, filed on Oct. 29, 2007.

(30) Foreign Application Priority Data

Oct. 28, 2008  (FR) ...................................... 08 05991

(51) Int. Cl.
*H01T 13/20* (2006.01)
*G01L 23/10* (2006.01)
*H01T 13/40* (2006.01)

(52) U.S. Cl.
CPC ................ *H01T 13/40* (2013.01); *G01L 23/10* (2013.01)
USPC ............................................... 313/141; 445/7

(58) Field of Classification Search
USPC .................................................. 313/118–145
See application file for complete search history.

(56) References Cited

U.S. PATENT DOCUMENTS

| 4,169,388 A | 10/1979 | Carrico et al. |
| 6,756,722 B2 | 6/2004 | Hiramatsu |

(Continued)

FOREIGN PATENT DOCUMENTS

| DE | 102005062881 | 7/2007 |
| EP | 0581067 A | 2/1994 |

(Continued)

*Primary Examiner* — Andrew Coughlin
(74) *Attorney, Agent, or Firm* — Robert L. Stearns; Dickinson Wright, PLLC

(57) ABSTRACT

A spark plug having an integral gasoline combustion sensor is disclosed. The spark plug includes a center electrode assembly with a terminal stud at one end and a center electrode with a sparking surface at an opposite end; a generally tubular insulator surrounding the center electrode assembly; a shell surrounding the insulator and having along its length a turn-over on a first end, a barrel having an outer surface and barrel shoulder on a gasket flange thereof, a threaded portion, and a ground electrode; and a piezo sensor assembly located on the barrel shoulder proximate the outer surface of the barrel which includes a lower electrode contact, a piezo transducer, an upper electrode contact, an isolator having a convex upper surface, and an upper bushing which is attached to the barrel.

33 Claims, 6 Drawing Sheets

(56) References Cited

U.S. PATENT DOCUMENTS

2002/0195917 A1    12/2002  Hiramatsu
2006/0214541 A1*    9/2006  Tsuzuki et al. ............... 310/328

FOREIGN PATENT DOCUMENTS

FR            2903531 A       1/2008
WO    WO 2008/003846          1/2008

* cited by examiner

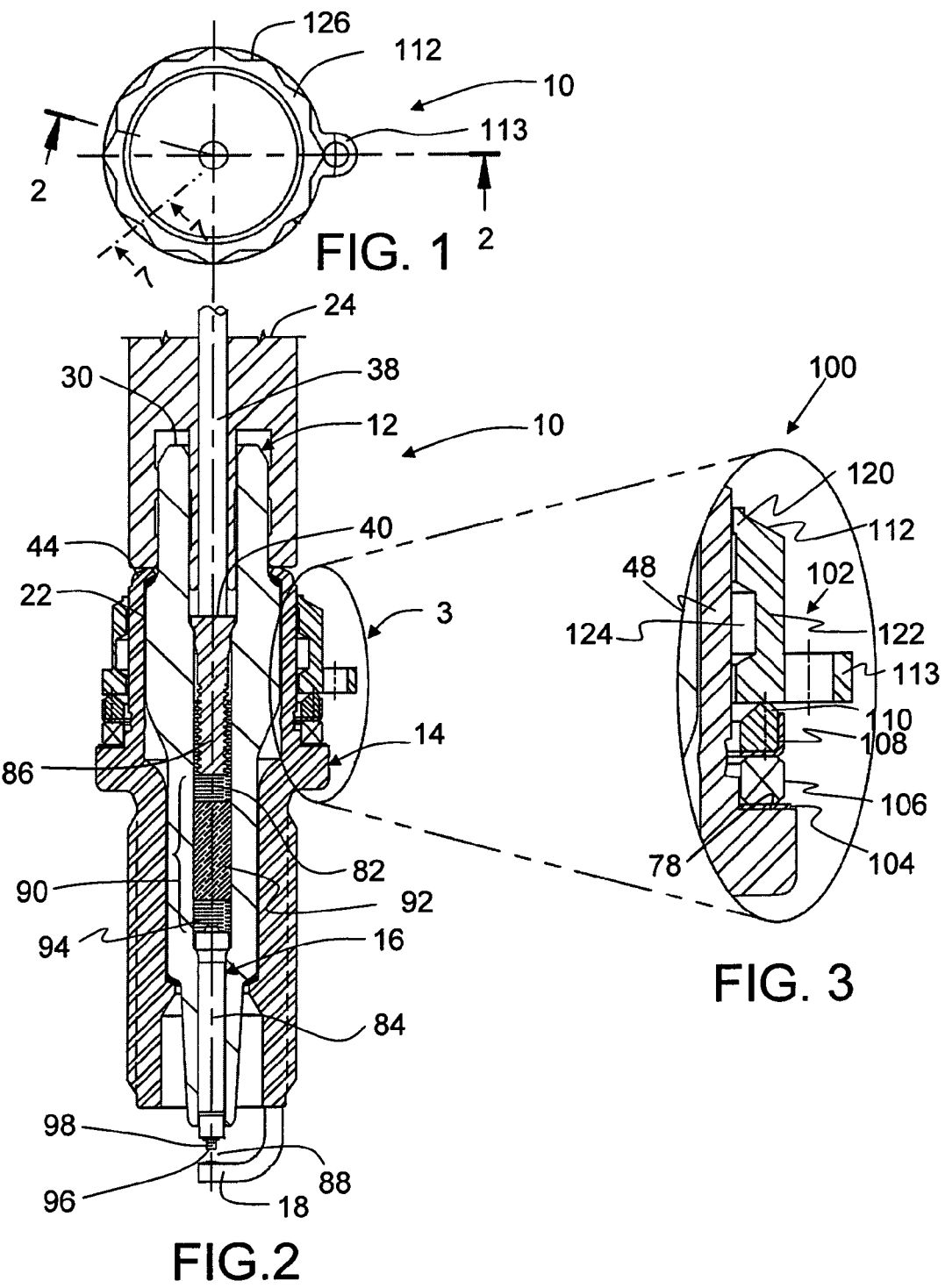

SPARK IGNITION DEVICE WITH IN-BUILT COMBUSTION SENSOR

This U.S. National Phase application claims priority to U.S. Provisional Application 60/983334, filed Oct. 29, 2007, French Application No. 00805991, filed Oct. 28, 2008, and International Application No. PCT/FR08/01520, filed Oct. 29, 2008, all of which are incorporated herein by reference.

BACKGROUND OF THE INVENTION

1. Field of the Invention

The present invention relates generally to spark ignition devices, such as spark plugs, and more particularly to spark plugs having an integrated combustion sensor.

2. Related Art

Spark plugs have been used for many years to provide a means to ignite the fuel air mixture in the combustion chambers of spark ignition internal combustion engines. Spark plugs have taken on many forms to adapt to the particular engine design and environment. Generally, spark plugs have a center electrode surrounded by an insulator wherein the insulator is disposed in and captured by a metal housing or shell. The shell typically has a plurality of threads which are matched to the threads in the cylinder head in a hole called spark plug hole. The threads allow the spark plug to be screwed into the cylinder head using a conventional tool. Further, the shell includes at least one ground electrode which is either located on or extending from an end of the shell proximate the center electrode. The ground electrode together with the center electrode define a spark gap. The shell also acts as a ground shield to provide an electrical ground path from the spark gap to the engine block. The spark plug seats or seals against the engine cylinder head to seal the combustion chamber and prevent combustion gases from escaping through the spark plug hole in the cylinder head.

There are trends in spark ignition engines toward ever greater power output and efficiency, as well as toward the use of flexible fuel types, which together have increased the demand for and usage of various types of combustion sensors necessary to achieve these objectives by enabling enhanced control of the engine and combustion processes.

Combustion sensors, particularly combustion pressure sensors, have generally been discrete sensors that are inserted into the combustion chamber through special threaded bores created just to accommodate these sensors, and the sensors themselves have generally been used only in engine and engine control development and not in mass production owing to their high cost and the additional demands that their use places on space in and adjacent to the cylinder head. Increasingly, engine designs employing multiple valves, multiple fuel injection points, coil on plug ignition systems, other combustion-related sensors and other features have placed increasing demands on the space envelope in and adjacent to the cylinder head immediately adjacent to the combustion chamber, particularly the space above the combustion chamber, which have in turn made it desirable to reduce the total space envelope needed for spark plugs and combustion pressure sensors. Further, use of combustion pressure sensors in conjunction with mass production engines and engine controllers necessitates the design of sensors having a substantially reduced cost compared to these discrete pressure sensors.

In this regard, combination of a spark plug and a piezoelectric combustion sensor has been proposed in U.S. Pat. No. 6,756,722. In the '722 patent, a spark plug having a metallic shell with an annular central bore, a ceramic insulator also having a center bore which is fixed to the shell by deforming a portion of the shell and also retained by a formed flange within the annular bore of the shell, a center electrode located within the center bore of the insulator and a ground electrode attached to the shell and spaced from the center electrode to form a spark gap. The spark plug of the '722 patent is equipped with a cylindrical piezoelectric sensor formed from a number of cylindrical components which are located on the external surface of the spark plug. The piezoelectric sensor components are captured between a metallic holder which also includes on one end a hex head for attaching the sparkplug and a flanged cylindrical seat which adapted to seat against one of the insulator or turn-over of the shell. A pair of cylindrical washers are placed proximate to and between the holder and seat to provide respective bearing surfaces and protect a respective pair of piezoelectric ceramic elements which are separated from one another by a single cylindrical electrode. An insulator is placed on the seat proximate the piezoelectric ceramics and the electrode to electrically isolate them from the seat. An o-ring seal is placed in a groove located in the inner bore of the seat to provide a water-tight seal between the seat and the spark plug insulator. During manufacture and assembly of the device, the sensor components are placed over the insulator and shell of the assembled spark plug and compressively preloaded between the holder and the seat. Once the predetermined preload is achieved, the holder is fixed to the shell by laser-welding to complete the assembly of the spark plug and sensor. During operation of the spark plug having the integral pressure sensor shown in the '722 patent in an internal combustion engine, with each combustion of the fuel-air mixture the pressure of the expanding combustion gases presses the insulator, shell, or both of them, depending on the particular configuration of the sensor and spark plug, against the seat, thereby further compressing and loading the piezoelectric elements and producing an electrical output signal which is related to the pressure exerted by the combustion gases. Hence, the device of the '722 patent is adapted to both provide the spark for spark ignition and an output signal indicative of the resultant combustion pressure.

Another spark plug with an integral pressure sensor has been described in conjunction German Utility Patent Application DE 102005062881. The '881 application describes a spark plug having similar spark plug elements as those described above with regard to the '722 patent, such that they are not repeated herein for brevity. However, the construction of the pressure sensor is somewhat different from that described in the '722 patent. Whereas the '722 patent described a sensor assembly on the exterior of the spark plug, particularly the shell and the insulator, the '881 application describes a piezoelectric pressure sensor that is located on the interior of the spark plug, particularly between a portion of the insulator and the shell. In the '881 publication, the insulator is supported within the shell on a shoulder that corresponds with the core nose region of the insulator. The insulator and shell also each have additional lower shoulders that together form a parallelogram-shaped cavity that is used to capture the elements of the piezoelectric sensor, which include a tapered piezoelectric cylinder which is tapered so as to mate with the shoulder of the insulator and a tapered spring washer that is tapered so as to mate with the shoulder of the shell. A circular electrode is formed on the surface of the lower shoulder of the insulator and provides an electrical contact for the tapered surface of the piezoelectric element. The circular electrode is electrically connected to a vertical electrode section which is in turn electrically connected to another circular electrode formed on the free surface of the insulator which is adapted to permit external electrical connection to and output from the sensor during operation of the pressure sensor. During assembly of the spark plug, the insulator, shell and piezoelectric sensor assembly are given a compressive preload in conjunction with forming an upper shoulder of the shell. During operation of the '881 spark plug having the integral pressure sensor in an internal combustion engine, with each combustion of the fuel-air mixture the pressure of the expanding combustion gases tends to elastically press the insulator away from the shell in the space which houses the sensor assembly, thereby cyclically reducing the assembly preload and producing an electrical signal which is related to the pressure exerted by the combustion gases.

PCT patent application WO-2008/003846 and illustrated by FIG. 9 discloses yet another configuration of a spark plug having an integral pressure sensor. In this application, the outer surface of the shell 208 has a threaded portion 220 which is used for threading the spark plug into a cylinder bore. Above the threaded portion 220 is a thread undercut 222 which transitions between threaded zone 220 and the barrel. The thread undercut 222 transitions to a gasket flange 224 of the barrel which is wider than the remainder of the barrel and narrows via a shoulder to the upper portion of the barrel. The upper portion of the barrel of the shell has a generally uniform wall thickness with a small deformable area or buckle zone of reduced wall thickness (prior to assembly) which is radially inwardly and axially collapsed in conjunction with heating of this portion during assembly of the spark plug to form a gas-tight seal and mechanically fix (i.e., "hot lock") the shell to the insulator. Following assembly, the upper portion of the barrel has a substantially uniform wall thickness. At the free end of the upper portion of the barrel opposite the gasket flange, a turn-over or flange 218 exists which includes shoulder 216 which is also formed in conjunction with spark plug assembly and captures the insulator 206 within the shell 208. The piezoelectric sensor assembly 230 abuts the lower shoulder and extends along the upper portion of the barrel. The piezo sensor assembly 230, may include either a piezoelectric element or a piezoresistive sensor element, and includes an intermediate or lower bushing 226 which is formed from a metal, such as steel, which extends in generally L-shaped in cross-section from a narrower section which abuts the barrel shoulder and buckle zone to a broader section which provides a seat for the lower ring electrode 234 on its lower surface. The upper surface of lower ring electrode 234 provides a mechanical seat and electrical contact for piezo element 232. Piezoelectric element 232 is in the form of a cylindrical ring or disk having a rectangular cross-section. Piezo element 232 may be either a piezoelectric element or a piezoresistive element. The lower surface of upper ring electrode 234 also provides an opposing mechanical seat and electrical contact for piezoelectric element 232. The upper surface of upper ring electrode 234 seats against the lower surface of insulator ring or disk 236. Insulator disk 236 abuts and electrically isolates the upper ring electrode 234 from the end of upper bushing 238. The inner diameter of the upper ring electrode 236 and the portion of outer diameter of the barrel to which it is adjacent are selected to provide a spacing sufficient to provide electrical isolation of the upper ring electrode 236 from the barrel. Upper bushing 238 engages and is welded to the outer surface of the barrel. The elements of the piezo sensor assembly 230 are in touching contact under a compressive preload by pressure applied from upper bushing 238 to the upper surface of the insulator disk 236. The welding of the upper bushing 238 to the barrel fixes the preload. The upper ring electrode 234 also includes an axially extending terminal connection 240 for electrical connection to a signal line for transmitting the signal output from the piezo sensor assembly 230. During operation of the '846 spark plug having the integral pressure sensor in an internal combustion engine, with each combustion of the fuel-air mixture the pressure of the expanding combustion gases tends to axially press outwardly against the insulator 206 from the sparking end associated with center electrode 202, ground electrode 204 and the spark gap formed thereby. These cause the insulator 206 to bear against the shell in the turn-over 218 and cause cyclic elastic tensile deformation of the shell 208 in the region between the turn-over 218 and the gasket flange of the barrel 224 which is also the region of the shell 208 which is proximate the piezo sensor assembly 230. This tensile stretching of the shell 208 also cyclically reduces the assembly preload of sensor 230 and produces an electrical signal which is related to the pressure exerted by the combustion gases and may be output through terminal 240. The sensor assembly also includes a cover plate 242 to shield the other sensor elements from mechanical damage, the ingress of dirt, water or other contaminants and to suppress the effects of radio frequency interference.

While the device of the '846 application has some similarity to the '722 patent in that the elements of the sensor are located on the exterior of the spark plug insulator and shell, it is distinguished from the '722 patent by the nature and arrangement of the sensor elements, as well as the means by which it interacts with the insulator and shell during operation of the device. For example, the '846 patent application describes a single piezoelectric element, as contrasted with two in the '722 patent, and it does not include an electrode as does the sensor assembly described in the '722 patent. Further, the piezoelectric sensor of the '085 patent application is attached only to the shell and is borne on by the shell, as contrasted with the various embodiments of the '722 patent in which the sensor is attached to the shell and borne on by a combination of the insulator and cover, or the insulator and shell and cover. The '846 application is similar to the '881 patent in that the sensor is compressively preloaded and during operation of the spark plug is cyclically unloaded as the insulator is pressed axially outwardly against the shell, thereby cyclically unloading a portion of the preload pressure as a result. However, the internal construction of the pressure sensor and use of differing elements and their arrangement distinguish the spark plug of the '085 application from that of the '881 application.

While such prior art spark plug designs having integrated pressure sensors each differ from one another, they represent examples of the progress in the art. However, there remains a need for integrated spark plugs with integrated combustion gas sensors which further improve the progress of the art.

SUMMARY OF THE INVENTION

A spark plug for igniting a fuel/air mixture in an internal combustion engine having an integral gasoline (or other fuel) combustion sensor is provided. The spark plug includes a center electrode assembly with a terminal stud at one end and a center electrode with a sparking surface at an opposite end; a generally tubular insulator surrounding the center electrode assembly; a shell surrounding the insulator and having along its length a turn-over on a first end, a barrel having an outer surface and barrel shoulder on a gasket flange thereof, a threaded portion, and a ground electrode; and a piezo sensor assembly located on the barrel shoulder proximate the outer surface of the barrel which includes a lower electrode contact, a piezo transducer, an upper electrode contact, an isolator having a convex upper surface, and an upper bushing which is attached to the barrel. The convex surface of the isolator is operative to produce line contact between the isolator and the upper bushing.

In another aspect, rather than a convex upper surface, the isolator has an upper surface which includes at least one chamfer. The at least one chamfer is also operative to produce line contact between the isolator and the upper bushing.

In another aspect, each of the at least one chamfers has a chamfer length and a chamfer angle and the location of the axial line of force along the upper surface of the isolator is a function of at least one of said chamfer length or said chamfer angle.

In another aspect, the piezo transducer is one of a piezoelectric or a piezoresistive transducer.

In another aspect, the piezo transducer is a piezoelectric transducer which includes a piezo ceramic. The piezo ceramic may include titanates, niobates, tantalates, tungstates or quartz.

In another aspect, the at least one chamfer is operative to establish an axial line of contact of force between a lower surface of said upper bushing and said top surface of said isolator.

In another aspect, the upper electrode contact has an L-shaped cross-section.

In another aspect, the upper bushing has a counterbore located on an inner diameter thereof.

In another aspect, the counterbore is located in a midsection of the upper bushing.

In another aspect, the counterbore has a cross-section profile in the shape of a trapezoid.

In another aspect, the piezo sensor assembly has an effective operating frequency up to about 20 kHz, and more particularly between about 0.5-20 kHz.

In another aspect, the invention includes a method of making a spark plug, including the steps of: forming a spark plug comprising: a center electrode assembly comprising a terminal stud at one end and a center electrode with a sparking surface at an opposite end; a generally tubular insulator surrounding the center electrode assembly; and a shell surrounding the insulator and having along its length a turn-over on a first end, a barrel having an outer surface and barrel shoulder on a gasket flange thereof, a threaded portion, and a ground electrode; inserting a piezo sensor assembly on said barrel shoulder proximate the outer surface of the barrel which includes a lower electrode contact, a piezo transducer, an upper electrode contact, an isolator having a convex upper surface, and an upper bushing; compressively preloading the piezo sensor assembly against the barrel shoulder; and attaching the upper bushing to the barrel to fix the preload of the piezo sensor assembly.

These and other features and advantages of the present invention will become more readily appreciated when considered in connection with the following detailed description and appended drawings, wherein:

BRIEF DESCRIPTION OF THE DRAWINGS

FIG. 1 is a top view of a spark plug in accordance with an embodiment of the present invention;

FIG. 2 is a partial cross-section view of the spark plug of FIG. 2 taken along section 2-2;

FIG. 3 is a cross-section view of region 3 of FIG. 2;

DETAILED DESCRIPTION OF THE PREFERRED EMBODIMENT

Figure 4:
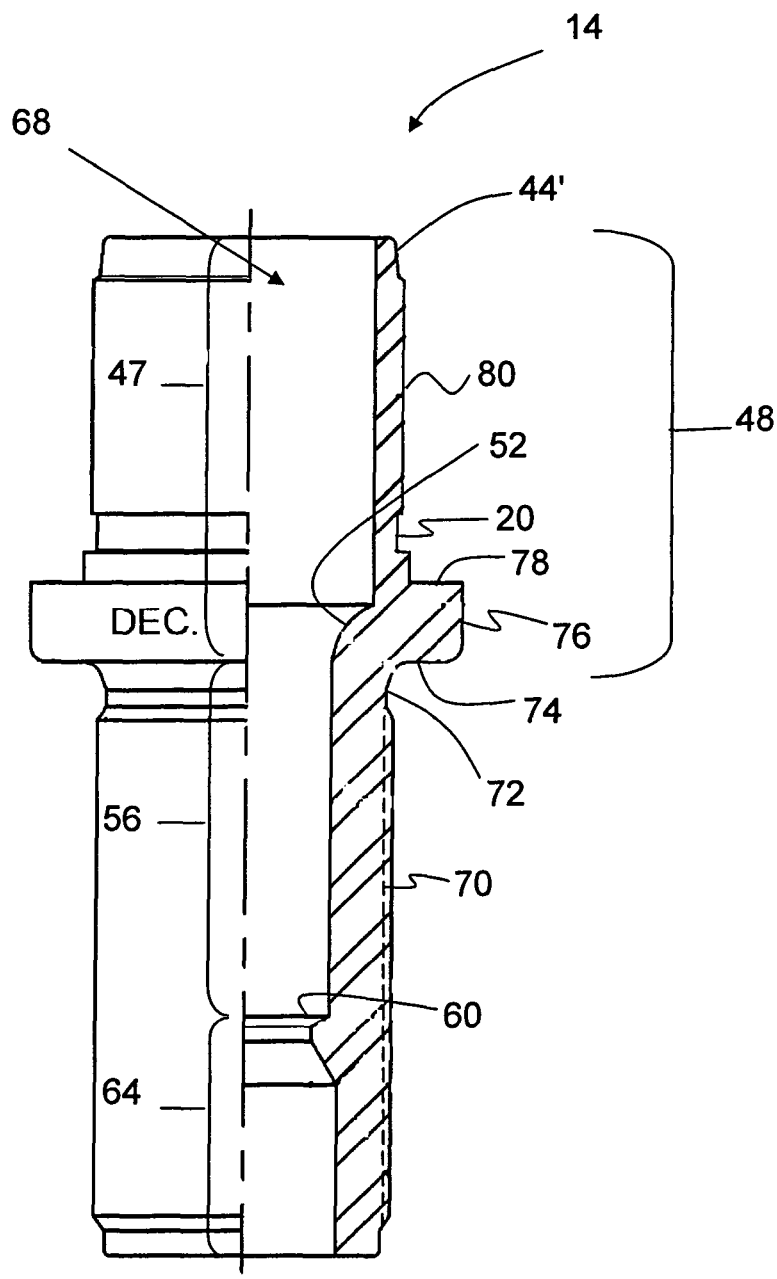
FIG. 4 is a cross-section view of the shell of FIG. 2.

Referring to the FIGS., wherein like numerals indicate like or corresponding parts throughout the several views, according to the subject invention, a spark plug operative for spark ignition and sensing of the resultant combustion events in a spark ignition application, such as an internal combustion engine, is generally shown at 10 in FIGS. 1-3. Spark plug 10 may be used with all manner and designs of internal combustion engines, including gasoline—powered engines, as well as those powered by alternate fuels, such as E85, propane and the like. Spark plug 10 includes an insulator shown generally at 12, an extended shell shown generally at 14, and a center electrode assembly shown generally at 16. Extended shell 14 is preferably made of an alloy of steel (i.e., 1215 steel) or similar material and is configured, as will be described in further detail below, to retain or capture insulator 12 and center electrode assembly 16. Insulator 12 is a generally cylindrical, elongated electrically insulating member having many possible shape configurations, but generally including a plurality of cross-sectional diameters, a tapered portion at the sparking end, and at least one central bore adapted to engagingly receive center electrode 16, and is made of alumina or a similar high-temperature dielectric material. Shell 14 has a section that includes a ground electrode 18 extending therefrom, as described further below. FIG. 2 illustrates spark plug 10 in the assembled condition following hot locking the shell and insulator together as described herein. In the fully assembled condition after hot locking as described herein, the deformable buckle zone 20 of shell 14 is at least partially collapsed in response to heating of this element coupled with application of compressive force which urges the portions of shell 14 above and below this element into pressing engagement with insulator 12.

Figure 5:
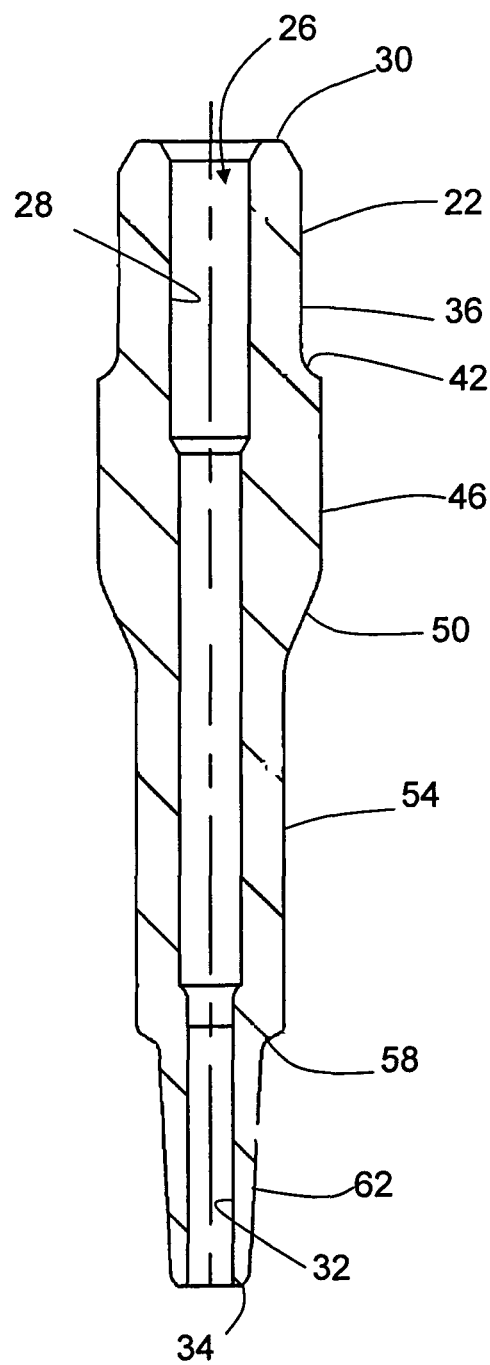
FIG. 5 is a cross-section view of the insulator of FIG. 2.
Figure 9:
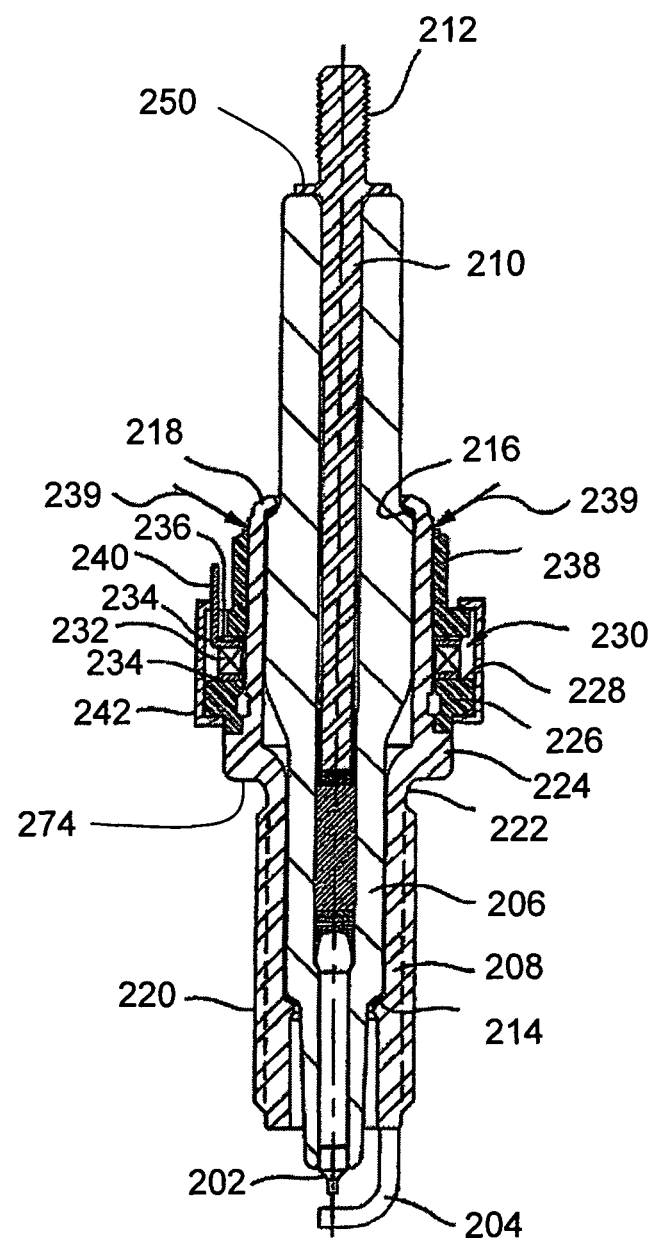
FIG. 9 is a cross-section view of a related art spark plug having an integrated combustion sensor.

Referring to FIGS. 2 and 5, the spark plug 10 includes a tubular ceramic insulator, generally indicated at 12, which is preferably made from a ceramic material such as aluminum oxide, particularly mixtures of aluminum oxide, zirconium oxide, and various glasses, glass formers and other modifiers, such as described in U.S. Pat. No. 7,169,723, or other suitable material having a specified dielectric strength, high mechanical strength, high thermal conductivity, and excellent resistance to thermal shock suitable for use as a dielectric material in the high-temperature operating environment of an internal combustion engine. The insulator 12 may be molded dry under extreme pressure and then sintered at high temperature using well-known processes. The insulator 12 has an outer surface which may include a partially exposed upper mast portion 22 to which an elastomeric spark plug boot 24 surrounds and grips to maintain an operative electrical connection with the ignition system. The exposed mast portion 22, as shown in FIG. 2, may include a series of ribs (not shown) for the purpose of providing added protection against spark or secondary voltage "flashover" and to improve the grip with an elastomeric spark plug boot. As compared with the related art spark plug of FIG. 9, insulator 12 of the present invention has a significantly shortened mast 22. For example, the related art design of FIG. 9 has a height of the insulator measured from the lower side of gasket seat 224 to the terminal end 250 of about 1.88 inches (47.75 mm), whereas the height of the same portion of the present invention is about 1.13 inches (28.70 mm). The insulator 12 is of generally tubular or annular construction, including a central bore or passage 26, extending longitudinally between an upper portion 28 proximate terminal end 30 and a lower portion 32 proximate core nose end 34. The central passage 26 is of varying cross-sectional diameter, generally greatest at or adjacent the terminal end 30 and smallest at or adjacent the core nose end 34. Referring again to FIGS. 1-3 and 5, generally tubular insulator 12 surrounds center electrode assembly 16 described below. Insulator 12 includes generally a continuous series of tubular sections of varying diameter. These sections include a first insulator section 36 which surrounds the connector extension 38 of the terminal stud 40 portion of center electrode 16. This first insulator section 36 transitions to a first insulator shoulder 42 which is in pressing engagement with the turn-over 44 (see FIG. 2 in assembled position, and prior to forming FIG. 4) of shell 14 described herein and in turn transitions to a second insulator section 46. Second insulator section 46 has a diameter which is greater than the diameter of the first insulator section 36 and is housed within the first bore section 47 within barrel 48 of shell 14 as described herein. A second insulator shoulder 50 is spaced from first shell shoulder 52 and transitions to a third insulator section 54. The third insulator section 54 preferably has a diameter less than the diameter of the second insulator section 46, and generally less than the diameter of the first insulator section 36, and is housed within the second shell section 56. A third insulator shoulder 58 is in pressing engagement with the second shell shoulder 60 and transitions to a tapered core nose 62, which is partially located within and extending from a third shell section 64. Core nose 62 houses center electrode 84. While the above describes the exemplary embodiment of insulator 12 illustrated in FIGS. 2 and 5, as well as its relationship to certain other elements such as shell 14 and center electrode assembly 16, other configurations of insulator 12 and these elements are possible in accordance with the present invention.

As depicted generally in FIGS. 2 and 4, an electrically conductive, preferably metallic shell is generally indicated at 14. Shell 14 may be made from any suitable metal, including various coated and uncoated steel alloys, such as 1215 steel. Shell 14 may be coated by plating or otherwise with protective coatings such as Ni or Ni alloys. The shell 14 has a generally annular interior surface or bore 68 which surrounds and is adapted for pressing and sealing engagement with the exterior surface of insulator 12 as described herein and includes at least one ground electrode 18, which may be attached as shown in FIG. 2, or which may comprise the end of shell 14 which is proximate center electrode 84. The shell 14 surrounds the lower sections, including second 46, third 54 and core nose 62 sections of the insulator 12, and includes at least one ground electrode 18. While the ground electrode 18 is depicted in a traditional single L-shaped style in FIG. 2, it will be appreciated that multiple ground electrodes of various L-shape, straight or bent configuration can be substituted depending upon the desired ground electrode configuration and the intended application for the spark plug 10.

Shell 14 has also an internal lower compression flange or second shoulder 60 adapted to bear in pressing contact against third insulator shoulder 58 of the insulator 12. Shell 14 further includes an upper compression flange or turn-over 44 which is crimped or otherwise formed over during the assembly operation to bear in pressing contact against first insulator shoulder 42 of insulator 12. This is formed from a shoulder portion 44' of barrel 48 which is shown in FIG. 4 prior to deformation. As noted, shell 14 may also include a deformable buckle zone 20 which is designed and adapted to collapse axially and radially inwardly in response to heating of buckle zone 20 and associated application of an overwhelming axial compressive force subsequent to the deformation of turn-over 44 in order to hold shell 14 in a fixed axial position with respect to insulator 12 and form a gas-tight seal between insulator 12 and shell 14. Gaskets, cement, or other sealing compounds can be interposed between the insulator 12 and shell 14 to perfect a gas-tight seal and improve the structural integrity of the assembled spark plug 10.

The outer surface of the shell 14 has a threaded portion 70 which is used for threading the spark plug into a cylinder head. Above the threaded portion 70 is a thread undercut 72 which transitions between threaded zone 70 and the barrel 48. The thread undercut 72 transitions to gasket seat 74 on a gasket flange 76 of the barrel 48 which is wider than the remainder of barrel 48 and narrows via barrel shoulder 78 to the upper portion 80 of the barrel 48. The gasket seat 74 is adapted to seat against a mating seat located in a spark plug bore in the cylinder head. The gasket seat 74 may be a squared shoulder paired with a gasket (not shown) to provide a suitable interface against which the spark plug 10 seats in the cylinder head and provides a hot gas seal of the space between the outer surface of the shell 14 and the threaded bore in the combustion chamber opening (not shown). Alternately, the cylinder seat 74 may be designed with a tapered seat to provide a close tolerance and self-sealing installation in a cylinder head which is also typically designed with a mating taper for this style of spark plug.

As illustrated in FIGS. 2, 4 and 5, shell 14 has an annular bore 68 with sections of varying diameters. They include a first bore section 47 associated with barrel 48. Extending inwardly from first bore section 47 is first shell shoulder 52 which is spaced as shown from second insulator shoulder 50 and in turn transitions to a second bore section 56. Second bore section 56 is associated with the upper part of threaded portion 72. Extending from second shell section 74 is second shell shoulder 60 which is adapted for pressing engagement with third insulator shoulder 58. Second shell shoulder 60 transitions inwardly and downwardly to third bore section 64 which is associated with the lower part of threaded portion 72 and has a diameter which is greater than that of second bore section 56.

While the above describes the exemplary embodiment of shell 14 illustrated in FIGS. 2, 4 and 5, as well as its relationship to certain other elements such as insulator 12 and center electrode assembly 16, other configurations of shell 14 and these elements are possible in accordance with the present invention; however, barrel 48 and barrel shoulder 78 similar in configuration and function to those described would be a part of such other embodiments as shell 14.

Unlike most spark plug shells, shell 14 does not include an attachment portion on an upper portion of barrel 48, such as a tool receiving hexagon or other feature for removal and installation of the spark plug in a combustion chamber opening. The outer surface of barrel is cylindrical. Rather, an attachment portion is incorporated into the sensor assembly as shown below.

As shown in FIG. 2, center electrode assembly 16 includes a terminal stud 40, electrically conductive resistor pack 90 and center electrode 84. Electrically conductive terminal stud 40 is disposed in the central passage 26 of the insulator 12 and extends longitudinally to a bottom end 86 which is embedded partway down central passage 26. The terminal stud 40 is adapted and operative for electrical connection to an ignition wire terminal 38 and receives timed discharges of high voltage electricity required to fire or operate the spark plug 10 by generating a spark in spark gap 88.

The bottom end 86 of the terminal stud 40 is embedded within a conductive glass seal 82, forming the top layer of a composite three layer suppressor-seal pack 90. The conductive glass seal 82 functions to seal the bottom end 86 of the terminal stud 40 and electrically connect it to a resistor layer 92. This resistor layer 92, which comprises the center layer and EMI suppressor of the three-layer suppressor-seal pack 90, can be made from any suitable composition. Depending upon the recommended installation and the type of ignition system used, such resistor layers 92 may be designed to function as a more of a traditional resistor suppressor or, in the alternative, as a low resistance. Immediately below the resistor layer 92, a second conductive glass seal 94 establishes the bottom or lower layer of the suppressor-seal pack 90 and electrically connects terminal stud 40 and suppressor-seal pack 90 to the center electrode 84. Top layer 82 and bottom layer 94 may be made from the same conductive material or different conductive materials. Many other configurations of glass and other seals and resistive and inductive EMI supressors are well-known and may also be used in center electrode assembly in accordance with the invention. Many other configurations of terminal stud 40 and center electrode 84 are also possible in accordance with the invention. Accordingly, center electrode assembly 16 is operative to transfer electricity from the ignition system travels through center electrode assembly 16 to reach the spark gap 88 and provide the sparking source for spark ignition combustion.

As shown in FIG. 2, conductive center electrode 84 is partially disposed in the central passage 26 and extends longitudinally from its head which is encased in the lower glass seal layer 94 to its exposed sparking end 96 proximate the ground electrode 18. The suppressor-seal pack 90 electrically interconnects the terminal stud 40 and the center electrode 84, while simultaneously sealing the central passage 26 from combustion gas leakage and also suppressing radio frequency noise emissions from the spark plug 10. Conductive center electrode 84 is preferably formed from an electrically conductive material which combines high thermal conductivity with high temperature strength and corrosion resistance. Among suitable materials for conductive center electrode 84 are various Ni-based alloys, including various nickel-chromium-iron alloys, such as those designated generally by UNS N06600 and sold under the trademarks Inconel 600®, Nicrofer 7615®, and Ferrochronin 600®, as well as various dilute nickel alloys, such as those comprising at least 92% by weight of nickel; and at least one element from the group consisting of aluminum, silicon, chromium, titanium and manganese. These alloys may also include rare earth alloying additions to improve certain high temperature properties of the alloys, such as at least one rare earth element selected from the group consisting of yttrium, hafnium, lanthanum, cerium and neodymium. They may also incorporate small amounts of zirconium and boron to further enhance their high temperature properties.

Either one or both of the ground electrode 18 and center electrode 84 may also be provided with a thermally conductive core (not shown). Thermally conductive core may be made from a material of high thermal conductivity (e.g., ≥250 W/M*° K.) such as copper or silver or various alloys of either of them. Highly thermally conductive cores serve as heat sinks and help to draw heat away from the spark gap 88 region during operation of the spark plug 10 and the associated combustion processes, thereby lowering the operating temperature of the electrodes in this region and further improving their performance and resistance to thermal degradation processes, such as high temperature oxidation and corrosion.

A firing tip 98 may optionally be located at the sparking end 96 of the center electrode 84, or ground electrode 18 as shown in FIG. 2. The firing tip 98 provides a sparking surface for the emission of electrons across spark gap 88. The firing tip 98 for the center electrode 84 or ground electrode 18 can be made according to any of the known techniques, including loose piece formation and subsequent attachment by various combinations of resistance welding, laser welding, or combinations thereof, of a pad-like, wire-like or rivet-like member made from any of the known precious metal or high performance alloys including, but not limited to, gold, a gold alloy, a platinum group metal or a tungsten alloy. Gold alloys, including Au—Pd alloys, such as Au-40Pd (in weight percent) alloys. Platinum group metals, include: platinum, iridium, rhodium, palladium, ruthenium and rhenium, and various alloys thereof in any combination. For purposes of this application, rhenium is also included within the definition of platinum group metals based on its high melting point and other high temperature characteristics similar to those of certain of the platinum group metals. Firing tips 98 may also be made from various tungsten alloys, including W—Ni, W—Cu and W—Ni—Cu alloys. Additional alloying elements for use in firing tips 98 may include, but are not limited to, nickel, chromium, iron, manganese, copper, aluminum, cobalt, tungsten, zirconium, and rare earth elements including yttrium, lanthanum, cerium, and neodymium. In fact, any material that provides good erosion and corrosion performance in the combustion environment may be suitable for use in the material composition of the firing tip 98.

Referring to FIGS. 1, 2, 3 and 6, having described the spark generating portion of spark plug 10, spark plug also includes an integral pressure sensor 100. Pressure sensor is a piezo-based sensor assembly 102 which is operative as a pressure transducer to convert mechanical elastic strain energy induced into the spark plug by variation of in-cylinder pressure into an electrical signal that can be output from the sensor assembly and thereby provide important information about the combustion events which are in turn used for various vehicle control functions. The piezo sensor assembly may be either a piezoelectric sensor assembly that produces a variable output voltage as a sensor signal or a piezoresistive sensor assembly that produces a variable resistance as a sensor signal, depending on the piezo transducer selected.

The piezo sensor assembly 102 abuts the barrel shoulder 78 and extends along the upper portion 80 of barrel 48. The piezo sensor assembly 102 includes a lower electrode contact 104, piezo transducer 106, upper electrode contact 108, isolator 110 and upper bushing 112. These elements are placed over the barrel 48 in the order described above and operatively joined together by application of a compressive assembly preload and held together under the assembly preload by welding upper bushing 112 to barrel 48.

Lower electrode contact 104 is in the form of a thin ring having an inner diameter that is greater than the outer diameter of barrel 48 such that lower electrode contact 104 may be assembled by placing it over barrel 48. The outer diameter of lower electrode contact 104 is sized appropriately in conjunction with barrel shoulder 78 to enable it to rest on barrel shoulder 78. Barrel shoulder 78 will also be of an appropriate thickness such that it does not plastically deform in response to the assembly preload. In an exemplary embodiment, barrel shoulder had an outer diameter of 0.75 inches (19.05 mm) and lower electrode contact 104 had an outer diameter of about 0.71 inches (18.03 mm). In the exemplary embodiment noted, the width (along the diameter) of lower electrode contact 104 was about 0.07 inches (1.78 mm) and the thickness was about 0.019 inches (10.483 mm). Lower electrode contact 104 may be made from any suitable electrically conductive material, including many pure metals and alloys. However, it is preferred that lower electrode contact 104 be formed from a conductive material which is not easily degraded with regard to its properties as an electrical contact in an engine operating environment, including having resistance to high temperature oxidation and corrosion processes known to occur in these environments. In the exemplary embodiment noted, lower electrode contact 104 was made from brass. The lower surface of lower electrode contact 104 abuts the barrel shoulder 78 and the upper surface provides both the mechanical seat and electrical contact for piezo transducer 106.

Piezo transducer 106 is in the form of a cylindrical ring or disk. While many cross-sectional configurations are believed to be possible, piezo transducer 106 may have a rectangular cross-section, including a square cross-section. Where rectangular, it may also include slight chamfers or radii at the rectangle corners. The piezo transducer 106 may be either a piezoelectric transducer that is operative to produce a variable output voltage as a sensor signal or a piezoresistive transducer that is operative to produce a variable resistance as a sensor signal. Piezo transducer 106 has a diameter that is greater than the outer diameter of barrel 48 such that it may be assembled by placing it over barrel 48, and is sized so as not to contact barrel 48 during manufacture and operation of piezo sensor assembly 102, thereby avoiding frictional loses associated with the movement of piezo transducer 106. The inner and outer diameters of piezo transducer 106 are sized appropriately in conjunction with lower electrode contact 104 so as to enable the lower surface of piezo transducer 106 to rest on the upper surface of lower electrode contact 104. The same diametral relationship holds true with respect to the contact between the upper surface of piezo transducer 106 and the lower surface of upper electrode contact 108. In an exemplary embodiment, piezo transducer 106 had an outer diameter of about 0.708 inches (17.983 mm). In the exemplary embodiment noted, the width (along the diameter) of piezo sensor 106 was about 0.069 inches (1.753 mm) and the thickness was about 0.079 inches (2.007 mm). The piezo transducer 106 may be formed from any suitable piezoelectric or piezoresistive material. In the exemplary embodiment noted, piezo transducer 106 is a piezoelectric transducer formed from a piezo ceramic. The piezo ceramic may include titanates, niobates, tantalates, tungstates or quartz.

Upper electrode contact 108 is in the form of a L-shaped ring having an inner diameter that is greater than the outer diameter of barrel 48 such that upper electrode contact 108 may be assembled by placing it over barrel 48. The inner diameter is sized so as to remain spaced and electrically isolated from the outer surface of barrel 48. The outer diameter of upper electrode contact 108 is sized appropriately in conjunction with the upper surface of piezo transducer 106 to enable the lower surface of upper electrode contact 108 to cover the upper surface of piezo transducer 106. In the exemplary embodiment noted, upper electrode contact 108 had an outer diameter of about 0.708 inches (17.983 mm). The width (along the diameter) of upper electrode contact 108 was about 0.069 inches (1.753 mm) and the height of the L-shape leg was about 0.070 inches (1.778 mm). The thickness of upper electrode contact 108 was about 0.008 inches (0.203 mm). Upper electrode contact 108 may be made from any suitable conductive material, including many pure metals and alloys. However, it is also preferred that upper electrode contact 108 be formed from a conductive material which is not easily degraded with regard to its properties as an electrical in an engine operating environment, including having resistance to high temperature oxidation and corrosion processes known to occur in these environments. In the exemplary embodiment noted, upper electrode contact 108 was made from brass. The lower surface of upper electrode contact 108 abuts the upper surface of piezo transducer 106 and the lower surface provides both the mechanical seat and electrical contact for piezo transducer 106. Electrical contact with the piezo sensor assembly 102 for transmitting electrical signal output of the assembly is made through upper electrode contact 108, preferably by making a suitable electrical contact with a signal wire (not shown). Any suitable form of electrical contact can be utilized, such as a shielded co-axial cable.

Isolator 110 is in the form of a chamfered cylindrical ring or disk. While many cross-sectional configurations are believed to be possible, isolator 110 may have a generally rectangular cross-section, including a square cross-section, with a flat lower surface and a convex upper surface, or an upper surface that is truncated by at least one chamfer 114. Where rectangular, it may also include a small chamfer or radii 116 at one or more of the rectangle corners. The isolator 110 may be made from any electrically insulating material that is operative to electrically isolate the upper electrode contact 108 and piezo transducer 106. Isolator 110 is also a mechanical actuator transferring mechanical energy into the upper electrode contact 108 and piezo transducer 106 and is preferably formed from a material having a high modulus of elasticity at engine operating temperatures, particularly in compression, such as a ceramic. Isolator 110 has a diameter that is greater than the outer diameter of barrel 48 such that isolator 110 may be assembled by placing it over barrel 48, and is sized so as not to contact barrel 48 during manufacture and operation of piezo sensor assembly 102, thereby avoiding frictional loses associated with the movement of isolator 110. The inner and outer diameters of isolator 110 are sized appropriately in conjunction with upper electrode contact 108 so as to enable the lower surface of isolator 110 to rest on the upper surface of upper electrode contact 108 while also fitting within the L-shaped leg of upper electrode contact 108. In an exemplary embodiment, isolator 110 had an outer diameter of about 0.690 inches (17.526 mm). In the exemplary embodiment noted, the width (along the diameter) of isolator 110 was about 0.06 inches (1.52 mm) and the thickness was about 0.066 inches (1.676 mm). The height is sufficiently large to provide electrical and mechanical isolation of L-shape leg of upper electrode contact 106 from upper bushing 112. The isolator 110 may be formed from any suitable dielectric material. In the exemplary embodiment noted, isolator 110 was formed from an alumina-based ceramic, such as that used for insulator 12. Chamfer 114 is operative to control the axial application of compressive force from upper bushing 112 through isolator 110 into piezo transducer 106. Chamfer 114 can alter the application of force through the entirety of the upper surface of isolator 110 to a reduced surface area and even to a line contact of force 118. By altering the number of chamfers, length of the chamfers and their angle, line contact can be ensured, and the axis of line of force 118 can be shifted inwardly or outwardly. By limiting the contact to a line contact, the application of radial forces associated with the elements of the sensor, including those associated with thermal expansion mismatch of the elements can be reduced. In addition, the application of the axial forces can be more precisely controlled as to the location of the application of the forces as well as the magnitude of the forces applied. By reducing the contact surface area, non-uniformity of the forces applied through the surface to the associated components is also reduced.

Upper bushing 112 engages and is welded to the outer surface of the barrel 48. The elements of the piezo sensor assembly 102 are in touching contact under a compressive preload applied from upper bushing 112 to the upper surface of the isolator 110. The welding of the upper bushing 112 to the barrel fixes the preload. Upper bushing 112 is in the form of a cylindrical ring having an inner diameter that is greater than the outer diameter of barrel 48 such that upper bushing 112 may be assembled by placing it over barrel 48. Upper bushing includes an inwardly extending alignment lip 120. The diameter at the lip is slightly less than the outer diameter of the barrel to establish a slight interference and aid in the concentric alignment of upper bushing 112. The cylindrical ring shape of the upper bushing 112 has a thinned section 122 which is thinned by incorporation of a counterbore 124 on the inside diameter of the midsection of the bushing. The counterbore 124 may have any suitable profile. In the exemplary embodiment noted, counterbore 124 had a trapezoidal section profile. By incorporation of thinned section 122 to upper bushing 112, the flexibility of upper bushing 112 is increased providing a spring-like radial response characteristic to upper bushing 112. Referring to FIG. 1, the outer surface of upper bushing 112 has a suitable spark plug attachment feature 126, such as a hex or bi-hex. The feature size will preferably conform with an industry standard tool size of this type for the related spark plug application. Of course, some applications may call for a tool receiving interface other than a hexagon, such as slots to receive a standard spanner wrench, or other features such as are known in racing spark plug and other applications and in other environments. Upper bushing 112 may also include a lug 113 which may be used for attachment of a signal cable and connector (not shown) used to transmit the output signal from the piezo sensor assembly 102 to a signal processing device, such as an engine controller or other engine diagnostic device. Alternately, upper bushing 112 can also be formed without lug 113. In the exemplary embodiment noted, the height of upper bushing 112 is about 0.320 inches (18.128 mm). The thickness of the bushing varies, including the thickness of thinned section 122, due to the milled hex features, but in the thickest sections, corresponding to the points of the hex, is about 0.080 inches (12.032 mm). The trapezoidal counterbore 124 is about 0.100-0.132 inches (12.54 to 3.353 mm) wide and about 0.032 inches (0.813 mm) deep. Upper bushing 112 may be made from any suitable material, including various grades of steel and plated steel. However, it is preferred that upper bushing 112 be made from a material having a coefficient of thermal expansion that is less than steel and as close as possible to that of the ceramic insulator material, such as Kovar, that also has enhanced performance in an engine operating environment, including having resistance to high temperature oxidation and corrosion processes known to occur in these environments. Kovar is an nickel-cobalt-iron alloy having a nominal composition, by weight, of about 29% Ni, 17% Co, 0.30% Mn, 0.20% Si and 0.02% C and the balance Fe. In the exemplary embodiment noted, upper bushing 112 was made from Kovar. The lower surface of upper bushing 112 abuts the upper surface of isolator 110 and provides the mechanical seat for isolator 110.

Figure 6:
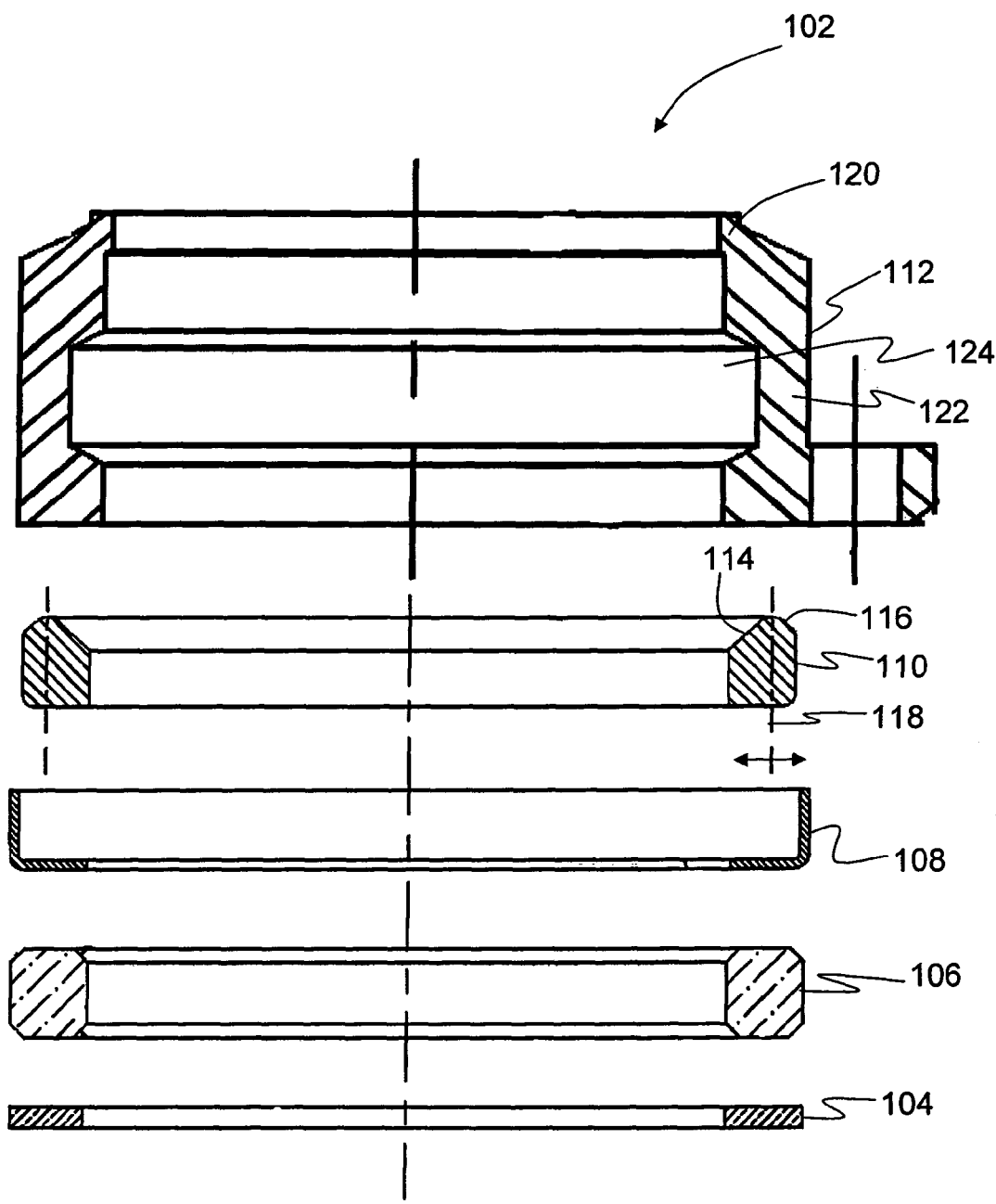
FIG. 6 is an exploded view of the piezo sensor assembly of FIG. 2.
Figure 7:
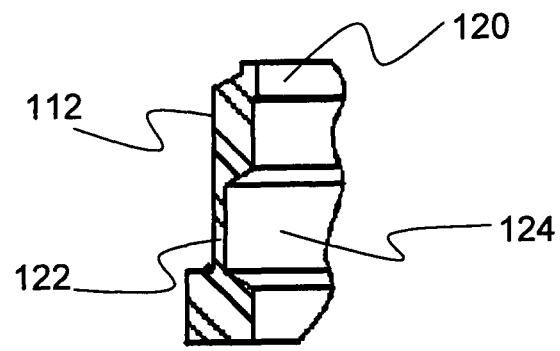
FIG. 7 is a cross-section view of FIG. 1 taken along section 7-7.
Figure 8:
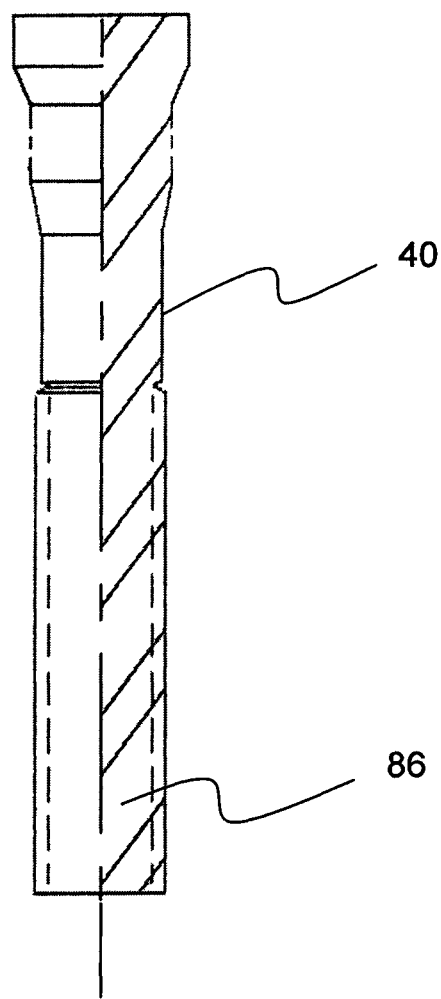
FIG. 8 is a partial cross-section view of the terminal stud of FIG. 2.

The elements of piezo sensor assembly are assembled over the barrel as shown in FIGS. 3 and 6 and described herein. They are subjected to a compressive preload of about 360 lbs. and then upper bushing 112 is laser-welded to barrel 48 to fix the assembly preload. During operation of spark plug 10 having integral pressure sensor 100 in an internal combustion engine, with each combustion of the fuel-air mixture the pressure of the expanding combustion gases tends to axially press outwardly against the insulator 12 from the region of the spark gap 88. This causes the insulator 12 to bear against the shell 14 in the turn-over 44 and causes the cyclic elastic tensile deformation of barrel 48 opposite piezo sensor assembly 102. This elastic tensile stretching of shell 14 during a combustion event also cyclically reduces the assembly preload of piezo sensor assembly 102 and produces an electrical signal which is related to the pressure exerted by the combustion gases and may be output through upper contact electrode 108.

Related art spark plug designs having integrated combustion sensors, such as those described above and shown in FIG. 9, have all utilized a conventional arrangement of the spark plug mast and terminal, such that the terminal extends above the mast of the insulator. These designs have not emphasized control of the pendulous mass of the upper portion of the spark plug, particularly the portion located above gasket seat 74. Applicants have observed that designs having a higher pendulous mass in the upper portion of spark plug 10 are subject to increased radial oscillation of this portion of spark plug 10 during operation of the spark plug and engine. This radial oscillation has a negative impact on the operation of the piezo sensor assembly by reducing the signal to noise ratio of the output signal. While it is possible to filter or damp the sensor output signal, this typically results in reduction of the response bandwidth of the sensor. For example, the use of a 10 kHz cut-off filter in related art devices eliminate their usefulness as a knock-sensor, since such sensors typically operate in the region of about 13 kHz. In contrast, the present invention which has a reduced pendulous mass and increased resistance to flash-over (undesirable discharge over the surface of mast 22) by virtue of the shortened insulator mast and elimination of a terminal which extends above the insulator mast, as well as within the upper portion of central passage 26, has an improved operating bandwidth between about 0.5-20 kHz, thereby extending and improving the sensor utility. As compared to the design shown in FIG. 9, the present invention also has an improved thermal response. This improved thermal response is associated with a reduced drift in the output signal related to thermal expansion of the sensor elements. The use of Kovar for upper bushing 112, as well as the design of upper busing 112 to include thin section 122, as well as the shape of the isolator 110, are believed to be responsible for the improved thermal response of piezo-sensor assembly 102.

The present invention features a significant shortening of the spark plug ceramic cap-end and upper shoulder to stiffen the assembly and reduce the pendulous mass of the upper portion of the spark plug. It further uses an internal (the central passage 26) high voltage terminal to further reduce pendulous mass in this region. Reduction of the height of the insulator also allows shortening of the shell particularly in the region of barrel 48 thereby strengthening the shell 14 and increasing its bending strength. The use of thin section 122 in upper bushing 112 introduces a flex element into the upper bushing 112 which facilitates damping of residual vibrations due to engine operations through the remainder of piezo-sensor assembly 102. The arrangement of the elements of the piezo-sensor assembly 102 and their design also facilitate reduction of the height of the sensor element stack and further reduction of the height of the spark plug above the gasket seat 74. The use of materials having a low co-efficient of thermal expansion for the upper bushing 112 (Kovar) and isolator 110 (ceramic) and the reduction of the height of the sensor stack by elimination of and consolidation of components as compared with related art designs (FIG. 9) both minimize the overall height of the thermally active sensor element stack as well as reduce its propensity for thermal drift.

The introduction of the flex element into the upper bushing 112 also can accommodate some misalignment during assembly by permitting flexure of the bushing. Introduction of an isolator 110 making line-contact with the upper bushing 112 also accommodates some misalignment during assembly and ensures purely axial loading of the sensor, as well as ensuring that the axial load is correctly distributed across the sensor face. The elements of piezo-sensor assembly 102 may be adapted to have the same outer diameter such that they may be loaded into a separate alignment fixture during the assembly process to ensure alignment of their inner diameters and concentricity and ensure that there is no interference between these elements and barrel 48 prior to pre-loading and welding the piezo-sensor assembly 102 to barrel 48.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly, the scope of legal protection afforded this invention can only be determined by studying the following claims.

What is claimed is:

1. A spark plug, comprising:
   a center electrode extending along a center axis and with a sparking surface at an end;
   a generally tubular insulator surrounding said center electrode and including at least one shoulder;
   a shell surrounding said insulator and having a turn-over on a first end, said first end being an extreme distal end of said shell, and said turn-over extending inwardly toward said center axis and along said shoulder of said insulator;
   said shell including a gasket flange presenting a gasket seat for engaging a gasket and presenting a barrel shoulder facing opposite said gasket seat;
   said shell further including a barrel extending from said barrel shoulder to said turn-over, a threaded portion, and a ground electrode; wherein said turn-over, said barrel having said outer surface and said barrel shoulder, said gasket flange, and said threaded portion of said shell are integrally formed; and
   a piezo sensor assembly located on said barrel shoulder between said barrel shoulder and said turn-over, said piezo sensor comprising a lower electrode contact, a piezo transducer, an upper electrode contact, an isolator, and an upper bushing which is attached to said barrel.

2. The spark plug of claim 1, wherein said piezo transducer is one of a piezoelectric or a piezoresistive transducer.

3. The spark plug of claim 2, wherein said piezo transducer is a piezoelectric transducer.

4. The spark plug of claim 3, wherein said piezoelectric transducer comprises piezo ceramic.

5. The spark plug of claim 1, wherein said isolator has an upper surface which includes at least one chamfer, and said at least one chamfer is operative to establish an axial line contact of force between a lower surface of said upper bushing and said top surface of said isolator.

6. The spark plug of claim 5, wherein each of said at least one chamfers has a chamfer length and a chamfer angle and the location of said axial line of force along said upper surface of said isolator is a function of at least one of said chamfer length or said chamfer angle.

7. The spark plug of claim 1, wherein said upper electrode contact has an L-shaped cross-section.

8. The spark plug of claim 1, wherein said upper bushing has a counterbore located on an inner diameter thereof.

9. The spark plug of claim 8, wherein said counterbore is located in a mid-section of said upper bushing.

10. The spark plug of claim 9, wherein said counterbore has a cross-section profile in the shape of a trapezoid.

11. The spark plug of claim 1, wherein said piezo sensor assembly has an effective operating frequency up to about 20 kHz.

12. The spark plug of claim 1, wherein said barrel shoulder of said shell is spaced from said first end of said shell by said outer surface of said barrel.

13. The spark plug of claim 1, wherein said isolator is formed of ceramic.

14. The spark plug of claim 1 further comprising a gasket disposed against said gasket seat.

15. A spark plug comprising:
   a center electrode with a sparking surface at an end;
   a generally tubular insulator surrounding said center electrode;
   a shell surrounding said insulator and having along its length a turn-over on a first end, said shell including a barrel having an outer surface and a barrel shoulder on a gasket flange thereof, a threaded portion, and a ground electrode;
   a piezo sensor assembly located on said barrel shoulder proximate said outer surface of said barrel, said piezo sensor comprising a lower electrode contact, a piezo transducer, an upper electrode contact, an isolator, and an upper bushing which is attached to said barrel; and
   wherein said isolator contacts and is compressed between an upper surface of said upper electrode contact and a lower surface of said upper bushing; and
   wherein said isolator has a convex upper surface, and said convex upper surface is operative to establish an axial line contact of force between a lower surface of said upper bushing and said upper surface of said isolator.

16. The spark plug of claim 15, wherein said piezo transducer is one of a piezoelectric or a piezoresistive transducer.

17. The spark plug of claim 15, wherein said piezo transducer is a piezoelectric transducer.

18. The spark plug of claim 17, wherein said piezoelectric transducer comprises mica.

19. The spark plug of claim 15, wherein said upper electrode contact has an L-shaped cross-section.

20. The spark plug of claim 15, wherein said upper bushing has a counterbore located on an inner diameter thereof.

21. The spark plug of claim 20, wherein said counterbore is located in a mid-section of said upper bushing.

22. The spark plug of claim 21, wherein said counterbore has a cross-section profile in the shape of a trapezoid.

23. The spark plug of claim 15, wherein said piezo sensor assembly has an effective operating frequency up to about 20 kHz.

24. The spark plug of claim 15, wherein said shell has a cylinder seat on a lower surface of said barrel, and said insulator has a length above a said cylinder seat of 1.13 inches (28.70 mm) or less.

25. The spark plug of claim 15, wherein said barrel shoulder of said shell is spaced from said first end of said shell by said outer surface of said barrel.

26. The spark plug of claim 15, wherein said isolator is formed of ceramic.

27. The spark plug of claim 15, wherein said gasket flange of said shell includes a gasket seat facing opposite said barrel shoulder, and further comprising a gasket disposed against said gasket seat.

28. A method of making a spark plug, comprising the steps of:
- forming a spark plug comprising:
  - a center electrode extending along a center axis and with a sparking surface at an end;
  - a generally tubular insulator surrounding said center electrode and including at least one shoulder; and
  - a shell surrounding said insulator and having a turn-over on a first end, said first end being an extreme distal end of said shell, said turn-over extending inwardly toward said center axis and along said shoulder of said insulator, said shell including a gasket flange presenting a gasket seat for engaging a gasket and a barrel shoulder facing opposite said gasket seat, said shell further including a barrel extending from said barrel shoulder to said turn-over, a threaded portion, and a ground electrode; wherein said turn-over, said barrel having said outer surface and said barrel shoulder, said gasket flange, and said threaded portion of said shell are integrally formed;
- inserting a piezo sensor assembly on said barrel shoulder between said barrel shoulder and said turn-over, said piezo sensor comprising a lower electrode contact, a piezo transducer, an upper electrode contact, an isolator having a convex upper surface, and an upper bushing;
- compressively preloading the piezo sensor assembly against the barrel shoulder; and
- attaching the upper bushing to the barrel to fix the preload of the piezo sensor assembly.

29. The method of claim 28, further comprising the step of forming the piezo transducer with an upper surface one of convex or chamfered such that the upper surface is operative to engage the upper bushing with a line contact of force.

30. The method of claim 29, further comprising forming the upper bushing with a counterbore on an inner diameter thereof 31. The method of claim 30, further comprising forming the counterbore to have a trapezoidal section profile.

32. The method of claim 28, wherein said barrel shoulder of said shell is spaced from said first end of said shell by said outer surface of said barrel.

33. A method of making a spark plug, comprising the steps of:
- forming a spark plug comprising:
  - a center electrode with a sparking surface at an end;
  - a generally tubular insulator surrounding said center electrode; and
  - a shell surrounding said insulator and having along its length a turn-over on a first end, said shell including a barrel having an outer surface and a barrel shoulder on a gasket flange thereof, a threaded portion, and a ground electrode;
- inserting a piezo sensor assembly on said barrel shoulder proximate said outer surface of said barrel, said piezo sensor comprising a lower electrode contact, a piezo transducer, an upper electrode contact, an isolator having a convex upper surface and a lower surface contacting an upper surface of said upper electrode contact, and an upper bushing including a lower surface contacting said isolator;
- compressing said isolator between said upper surface of said upper electrode contact and said lower surface of said upper bushing, wherein said convex upper surface of said isolator is operative to establish an axial line contact of force between said lower surface of said upper bushing and said upper surface of said isolator; and
- attaching the upper bushing to the barrel.

* * * * *